No. 880,010.  
PATENTED FEB. 25, 1908.

F. CAHA.  
END GATE.  
APPLICATION FILED SEPT. 12, 1907.

Witnesses  
L. B. James  
C. H. Griesbauer

Inventor  
FRANK CAHA  
by H. B. Willson & Co.  
Attorneys

UNITED STATES PATENT OFFICE.

FRANK CAHA, OF VALPARAISO, NEBRASKA.

END-GATE.

No. 880,010. Specification of Letters Patent. Patented Feb. 25, 1908.

Application filed September 12, 1907. Serial No. 392,534.

*To all whom it may concern:*

Be it known that I, FRANK CAHA, a citizen of the United States, residing at Valparaiso, in the county of Saunders and State of Nebraska, have invented certain new and useful Improvements in End-Gates; and I do declare the following to be a full, clear, and exact description of the invention, such as will enable others skilled in the art to which it appertains to make and use the same.

This invention relates to an improved end gate for wagons.

The object of the invention is to provide a two-part end gate, one part of which is hinged to the other and adapted to be opened outwardly to permit the unloading of grain or other contents of the wagon, the other part being practically one with the wagon box or body, is therefore less liable to become lost or broken.

Another object of the invention is to produce an end gate which is simple, cheap and durable, and formed of a few parts constructed to resist wear.

Figure 1:
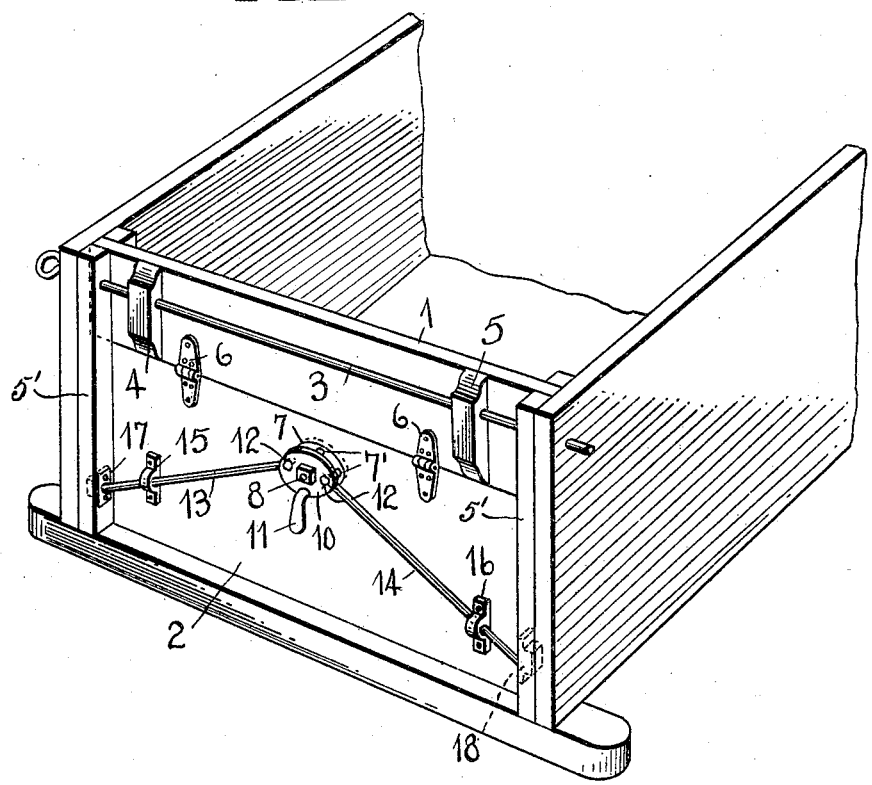
Figure 2:
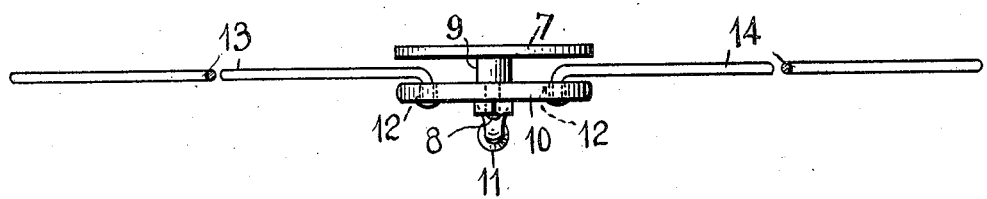

In the accompanying drawings,—Figure 1 represents a perspective view of the rear portion of a wagon box showing this improved end gate applied; Fig. 2 represents a side elevation of the gate fastening means detached This improved end gate is shown composed of two members 1 and 2. The upper or top member 1 is made similar to the ordinary end gate, but of less height, and is fitted to slide vertically in the grooves at the opposite sides of the wagon box with which all wagons are equipped. An ordinary wagon rod 3 passes through two cleats 4 and 5 on the member 1 and through the sides of the wagon box, and holds said member 1 firmly in place at the top of the wagon box.

Below the lower edge of the top member 1 grooves in the sides of the box which hold the member 1 in position are filled in or closed, and the part 2 is extended flush with the outside cleat on the sides of the box, the inner cleat extending out a sufficient distance to form a stop for the member 2. The lower outwardly swinging member 2 is connected with the part 1 by hinges, as 6, which are preferably in the form of strap hinges, the leaves of which are fastened respectively to the parts 1 and 2 to permit the part 2 to be swung outwardly from the bottom of the wagon box and allow the grain or other substance to run out.

The swinging gate member 2 is secured in place when closed by a fastening device which consists of a flat disk 7 having a bolt 8 projecting therefrom and on which a spacing sleeve 9 is mounted. This disk 7 is countersunk in the gate member 2 and fastened by bolts as 7' to the upper part of said member midway the ends thereof. On the bolt 8 above the spacing sleeve 9 is revolubly mounted an eccentric or cam member 10, here shown in the form of an oblong plate having a handle 11 depending from the lower side thereof. This cam member 10 is provided with two apertures or sockets, as 12 into which project the bent ends of two rods 13 and 14, whereby said rods are pivotally connected with said cam member These rods 13 and 14 extend through guides or keepers 15 and 16, arranged near the lower end of the gate member 2, and the free ends thereof in closed or projected position engage two metal sockets 17 and 18 arranged on the cleats as 5' on the sides of the wagon box near its bottom. The disk and the cam member are preferably disposed near the top of the member 2, to provide for the oblique arrangement of the rods 13 and 14 to brace the member 2 diagonally and securely lock the lower end thereof to the wagon body, the weight of the rods and the depending handle 11 being downward, tend to hold the device in locked position, except when positively actuated to release it.

In the use of this invention, the two-part gate is secured to the wagon box by slipping the top member 1 in the grooves formed at the upper ends of the inner faces of the side members of the box and the rod 3 is passed transversely through the sides of the wagon box, and the cleats 4 and 5 on the gate member 1, whereby the latter is held securely in place.

The handle 11 of the fastening means is then turned to one side or the other to withdraw the free ends of the rods 13 and 14 within the ends of the member 2, and the member 2, which is hinged to the sliding member 1 is then pushed inwardly into place, and the handle 11 is turned down into vertical position, which causes the free ends of the locking rods 13 and 14 to project into the metal sockets 17 and 18 on the cleats 5', whereby the member 2 is securely locked to the wagon box until the cam member 10 is again turned by means of its handle 11.

I claim as my invention:—

In combination with a wagon box, of an end gate composed of two members hingedly connected, one of said members being adapted to be fixed to the wagon box and the other member being free to swing outwardly, a cam revolubly mounted on said swinging member near its upper edge and provided on its lower side with a depending operating handle, sockets arranged in the side members of said wagon box on the inner faces thereof at their lower ends, keepers arranged near the lower corners of said swinging member, locking rods pivotally connected at one end with said cam and extending downwardly in opposite directions, passing through said keepers and having their free ends arranged to engage said sockets on the turning of the cam.

In testimony whereof I have hereunto set my hand in presence of two subscribing witnesses.

FRANK CAHA.

Witnesses:
JOHN OLSON,
S. H. JONES.